April 11, 1967   E. BETZ   3,313,010
APPARATUS FOR PRODUCING A CONTINUOUS WEB
OR CONTINUOUS ROW OF BODIES
Filed Aug. 11, 1964   2 Sheets-Sheet 2
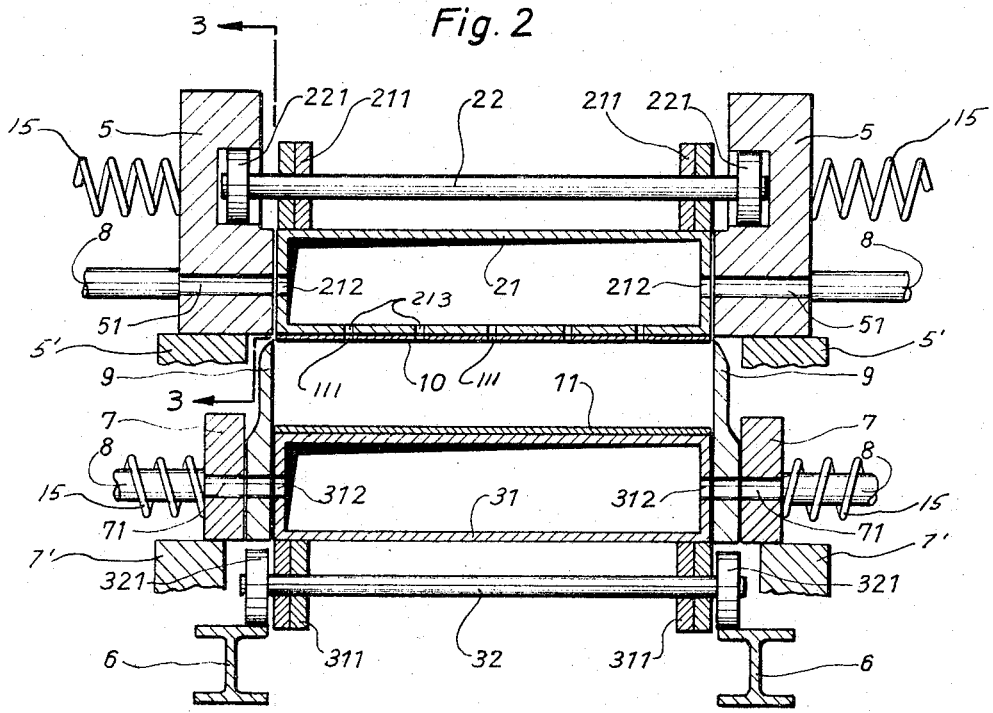
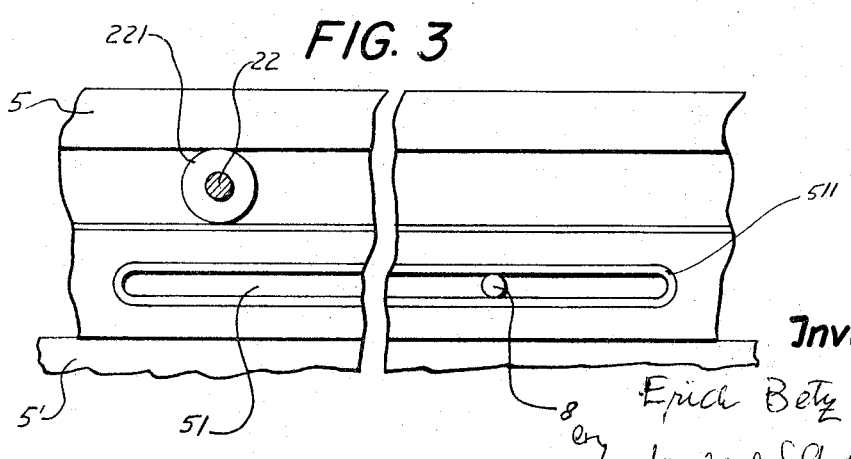
Inventor:
Erich Betz
by Michael Striker, attorney ns # United States Patent Office 3,313,010
Patented Apr. 11, 1967

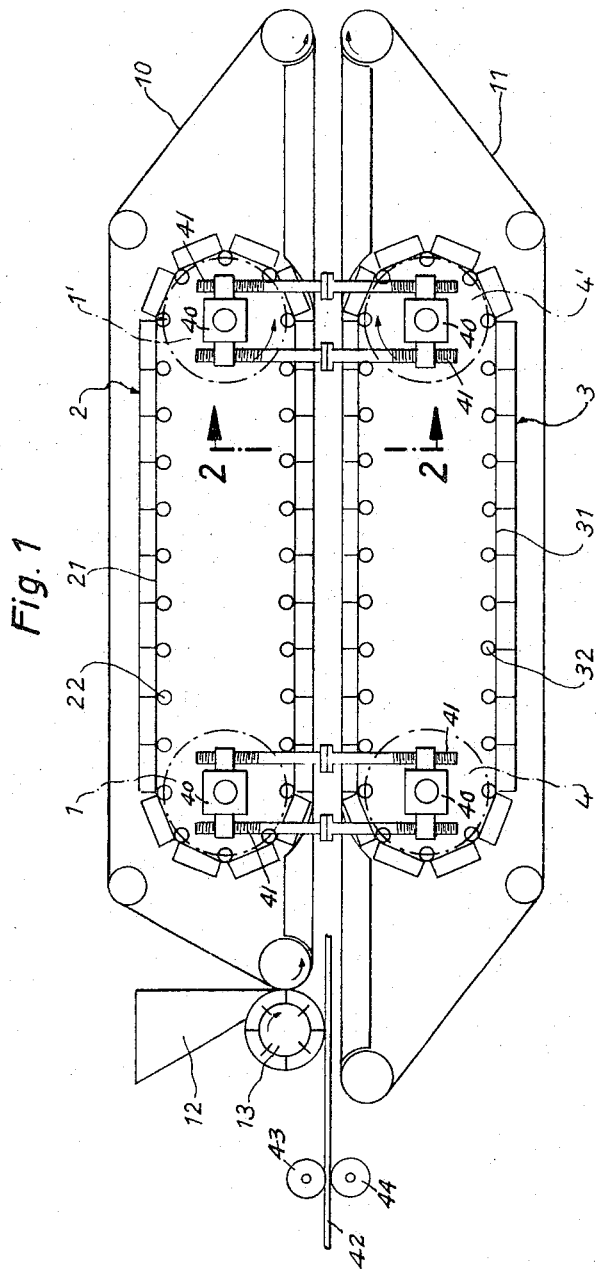

3,313,010
APPARATUS FOR PRODUCING A CONTINUOUS WEB OR CONTINUOUS ROW OF BODIES
Erich Betz, Worms, Germany, assignor to Deutsche Linoleum-Werke Aktiengesellschaft, Maximiliansau, Germany
Filed Aug. 11, 1964, Ser. No. 388,814
Claims priority, application Germany, Aug. 17, 1963, D 42,271
14 Claims. (Cl. 25—99)

The present invention relates to an apparatus for producing a continuous web or a continuous row of bodies from a selected material or a plurality of materials in which the material or materials are continuously fed between a pair of endless conveyor means respectively mounted on guide rollers for movement along paths in which the two conveyor means have adjacent runs defining a space therebetween into which the material is fed.

During the manufacture of, for instance, continuous webs of plastic material, in which the plastic material is fed in particulated form into the apparatus, it is usually necessary to subject the plastic material during subsequent operating steps to different temperatures or pressure or to treat the material with liquids or gases. In order to carry out these steps it was heretofore necessary to guide the material to be treated in successive steps through special apparatus, for instance, a soaking apparatus, a drying oven, etc.

Also during the manufacture of a continuous row of bodies it is quite often necessary to subject this row of bodies to different operating steps in a series of successive apparatus.

Such apparatus becomes especially complicated when, for instance, the continuous web of plastic material or a continuous row of bodies are to be maintained during the successive operating steps under constant pressure or contained enclosed in a mold.

It is an object of the present invention to provide for a relatively simple apparatus for producing a continuous web or a continuous row of bodies from a selected material or materials in which the material or materials are continuously transported through the apparatus while being subjected to the desired temperature and/or pressure or in which the material while being transported through the apparatus is simultaneously treated wtih gases or liquids.

It is a further object of the present invention to provide for an apparatus of the type mentioned in which the material during its movement through the apparatus is contained between elements of the apparatus determining the shape of the desired end product, which elements move simultaneously with the material through the apparatus so that no friction will occur between the material and these elements, and in which these elements are constructed in such a manner so as to transmit to the material the desired temperature, pressure or humidity or to permit treatment of the material as it passes through the apparatus with gases or liquids.

It is a further object of the present invention to provide for such an apparatus which is composed of relatively few and simple parts so that the apparatus will stand up trouble-free under extended use.

With these objects in view, the apparatus of the present invention for producing a continuous web or a continuous row of bodies from a selected material, or materials, mainly comprises support means, a pair of endless conveyor means formed from a plurality of hollow plates hingedly connected to each other and each formed with passage means having an outer and an inner end communicating with the interior of the hollow plate, two pairs of roller means turnably mounted on the support means and respectively supporting each of the endless conveyor means for movement along a path in which one of the conveyor means has a lower and the other an upper run arranged adjacent each other to define an elongated space between the runs, a plurality of channel means mounted on the support means and having outlet ends arranged to communicate with the outer ends of the aforementioned passage means in the plates at least temporarily during movement thereof along the upper and lower runs, respectively, for feeding fluid into the interior of the plates, and means for feeding material into the space between the upper and lower runs of the two conveyor means.

The hollow plates are preferably box-shaped and in this case the passage means which communicate with the interior of the hollow plates are preferably formed in the opposite side walls of the box-shaped plates so that for instance heating or cooling fluids may be introduced into the interior of the plates. In this case it is also possible to form in the wall of each plate which is directed toward the material fed between the plates forming the upper and the lower run of the two conveyor means a plurality of closely spaced openings so that the fluid fed into the interior of the plates may impinge on the material located therebetween.

To prevent escape of the material in lateral direction from the space between the upper and lower runs, side plates are preferably connected to opposite side walls of each plate of at least one of the conveyor means which project toward the corresponding plate of the other conveyor means to laterally confine the space formed between the two runs of the conveyor means. Preferably, the free edge portions of the side plates and the corresponding edge portions on the plates of the other conveyor means are provided with elongated sealing means along the facing edge portions to seal any gap forming therebetween. These elongated sealing means may be formed by elongated sealing strips in abutting engagement with each other, or the strips may also be formed with elongated grooves and ridges interengaging each other.

Elongated beams of substantially rectangular cross section may also be provided for guiding the plates of the two endless conveyor means at least during the passage thereof along the lower and upper run, respectively, which beams are arranged closely adjacent to opposite side walls of the plates. In this case the channel means are formed in the beams and these channel means may have the form of elongated channels open toward the outer surface of the respective side walls of the plates so as to communicate with the passage means formed therein while conduits leading from the outer surface of the beams into the channel serve to feed fluid into or out of the channel means in the beams. Sealing means are preferably provided on the inner surfaces of the beams along the channel means and abutting against the side faces of the plates. It is also possible to mount the beams movable in direction towards the end walls of the plates and to provide means which press the beams against the end walls of the plates to thus improve the seal between the channel means formed in the beams and passage means in the plates.

Rollers may be also provided on each of the plates which may be guided in grooves formed in the aforementioned beams or additional beams may be provided for rollingly supporting these rollers.

In order to produce between the two endless conveyor means continuous webs or a continuous row of bodies of different height or thickness, it is preferred to arrange one of the endless conveyor means and preferably the upper one adjustable in its elevation so as to change the distance of the lower run of the upper conveyor means from the upper run of the lower conveyor means and preferably the arrangement may also be made in such a manner that the lower run of the upper conveyor means, for instance, may be tilted with regard to the upper run of the lower conveyor means so that the two runs will not extend parallel with respect to each other but define between themselves a space tapering toward one end of the conveyor means. This can be simply obtained by mounting the shafts of the pair of roller means of, for instance, the upper conveyor means in an adjustable manner to change the elevation of these shafts. If the plates are additionally guided in the manner as mentioned before on beams, the latter have to be mounted also adjustable so that their elevation or inclination can be changed accordingly together with any change of elevation in the shafts of the corresponding roller means. When the plates during the passage thereof along the upper and lower runs, respectively, are guided on beams located laterally of the plates, it may also be of advantage to mount the beams of the upper and lower conveyor means movable toward each other so as to narrow the space defined between the upper and the lower run and mechanical, pneumatic or hydraulic means may be provided to press the beams toward each other.

To prevent bending of the individual plates, abutment means may also be provided between the beams of the upper and lower conveyor means, and such abutment means may consist of slide rails or rollers which abut against faces of the plates opposite to the faces thereof which engage the material during passage of the plates along the upper and lower run, respectively.

Instead of providing the passage means in the side walls of the respective plates, it is also possible to provide such passage means in the walls of the plates which during passage of the plates through the upper or the lower run, respectively, are directed away from the material fed into the space between the runs, and in such an arrangement the elongated channel means will have to be arranged accordingly, that is channel means for the upper conveyor will extend along the top walls of the plates of the upper conveyor forming the lower run thereof and corresponding channel means for the lower conveyor will be arranged along the bottom walls of the plates forming the upper run of the lower conveyor.

The walls of the plates which confine the material therebetween during the passage of the plates along the upper and lower runs, respectively, may also be formed with cavities or the walls may be formed with flat outer surfaces and be provided with means to attach thereto profiled members to produce in the material fed between the upper and lower run of the two conveyor means desired profiles and contours. The apparatus of the present invention may also include an endless band extending about the plates of each conveyor means and such an endless band may either be completely flat or formed with a desired profile, or this band may also be provided with a plurality of closely spaced openings therethrough. The band is preferably formed from thin sheet steel, however, this band may also be formed from felt or other material.

The means for feeding the material into the space between the upper and lower run may also include an additional endless conveyor band arranged to feed the material into the gap formed between the upper and lower run of the two conveyor means, or the band which extends about the plates of the lower conveyor means may be extended beyond one end of the conveyor means and a feed hopper may be arranged above the extending portion of the band about the lower conveyor means. The machine of the present invention may also include means in the region of the feed hopper for feeding reinforcing means such as wire meshes, wires, metal rods or similar elongated reinforcing elements into the space between the upper and lower run of the two conveyor means simultaneously with the granulated material fed into this space and such means may include a pair of cooperating feed rollers arranged ahead of the feed hopper for feeding the elongated reinforcing elements into the space between the runs.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic side view of the apparatus of the present invention;

FIG. 2 is a sectional view taken along lines 2—2 of FIG. 1 and drawn to an enlarged scale; and FIG. 3 is a partial sectional view taken along line 3—3 of FIG. 2 and viewed in the direction of the arrows.

Referring now to the figures of the drawings, it will be seen that the apparatus of the present invention comprises an upper endless conveyor means 2 formed by a plurality of hollow, preferably box-shaped plates 21 hingedly connected at adjacent ends to each other and the thus formed endless chain is guided for movement in a direction in which the lower run of this chain of the upper conveyor means moves from the left towards the right, as viewed in FIG. 1, on a pair of rollers 1, 1' one of which is driven by a motor, not shown in the drawing. The rollers 1 and 1' of the upper conveyor means are mounted on a support frame, not shown in FIG 1, in such a manner so that the elevation of the axes of the roller means 1 and 1' may be adjusted to change the elevation and/or the inclination of the endless conveyor means 2. For this purpose, the bearings 40 supporting the shafts of the rollers 1 and 1' may be mounted in substantially vertical extending slides of the supporting frame of the machine and screw spindles 41 extending in direction of the slides may cooperate with the bearings in a well known manner to adjust the elevation of the bearings. The apparatus of the present invention further includes an endless lower conveyor means 3 formed by a plurality of hollow, box-shaped plates 31 which are hingedly connected at adjacent ends to each other and which are guided for movement on a pair of rollers 4, 4' which may be mounted on the support frame of the apparatus at a fixed elevation and one of which is driven by a motor, not shown in the drawing, so that the upper run of the lower conveyor means 3 moves in the same direction and with the same speed as the lower run of the upper conveyor means 2. The plates 21 of the upper conveyor means 2 are hingedly connected to each other and for this purpose each of the plates 21 is provided at opposite ends thereof with a pair of lugs 211, as best shown in FIG. 2, and each of the lugs 211 has a free end portion overlapping the end portion of a corresponding lug on the adjacent plate and the overlapping end portions on adjacent plates are formed aligned bores through which a shaft 22 extends. The plates 31 of the lower conveyor means 3 are provided with corresponding lugs 311 having also overlapping end portions formed with aligned bores therethrough through which a shaft 32 extends. Rollers 221, respectively 321, are mounted on opposite end portions of the shafts 22, 32, respectively, for rotation with these shafts. The rollers 221 of the upper conveyor means are guided in grooves formed in beam means 5 of substantially rectangular cross section respectively arranged along opposite side walls of the plates 21, whereas the rollers 321 of the lower conveyor means roll along the upper surfaces of two additional guide beams 6 of I-shaped cross section forming part of the support frame of the apparatus.

The box-shaped, hollow plates 21 and 31 are respectively provided at opposite end walls thereof with passage means 212, respectively 312, therethrough having respectively inner ends communicating with the interior of the respective plate and outer ends aligned with channel means 51, or 71, respectively, formed in the beam means 5 and 7 arranged adjacent opposite side walls of the plates 21 and 31. The channel means 51 and 71 may be in the form of a plurality of spaced bores extending through the beams 5 and 7, respectively, or these channel means may be in the form of elongated grooves open toward the respective side wall of the respective plate and aligned with the passage means formed therethrough so that fluid fed through conduits 8 into the channel means of the beams 5 and 7 may pass through the passage means 212, respectively 312, into the interior of the plates 21, respectively 31, while the plates 21 move along the lower run of the upper conveyor means and while the plates 31 move along the upper run of the lower conveyor means. The channel means 51 may extend substantially along the whole length of the lower run of the upper conveyor means and the channel means 71 may extend along the whole lower upper run of the lower conveyor means, or separate channel means longitudinally spaced from each other may be provided along the upper and the lower run, and of course in this case separate conduit means 8 are provided for each of the separated channel means.

Side plates 9 are connected in any known manner, such as for instance by welding, to opposite side walls of the plates 31 of the lower conveyor means so as to project during passage of the plates 31 of the lower conveyor means along the upper run thereof towards the corresponding end edges of the plates 21 of the upper conveyor means to prevent escape of material in lateral direction from the space between the two runs. Elongated sealing means or sealing strips, not shown in the drawing, are preferably provided along the free edges of the side plates 9 and along the corresponding edges of the plates 21 of the upper conveyor means to seal any gap forming between these edges. The side plates 9 are formed with openings therethrough aligned with the passage means 312 in the lower plates 31 to permit passage of fluid from the channel means 71 into the passage means 312 and from there into the interior of the plates 31.

The beams 5 of the upper conveyor means and the beams 7 of the lower conveyor means are preferably mounted on support means 5', respectively 7', movable towards each other and means, shown in FIG. 2 as compression springs 15, engage the outer surfaces of the beams 5 and 7, respectively for pressing the same toward each other. Instead of the springs 15, hydraulic jacks or pneumatic jacks may also be used for pressing the beams 5 and 7, respectively, toward each other. In such an arrangement the conduits 8 have to be formed from flexible material or be otherwise connected to the beams 5 and 7, respectively, to permit movement of the beams towards each other. To prevent any escape of fluid through any gap formed between the inner faces of beams 5 and 7 and the corresponding outer faces of the side walls of plates 21 or side plates 9, respectively, sealing means are provided about the open ends of the channel means 51, 71, respectively and such sealing means in form of an elongated strip 511 extending about the groove-shaped channel means 51' in the upper beams 5 are shown in FIG. 3. It is understood that corresponding sealing means are also provided about the channel means 71 in the beams 7.

As mentioned before, it is also possible to provide instead of or in addition to the passage means 212, respectively 312, formed in the opposite side walls of the hollow, box-shaped plates 21 and 31, passage means in the walls of the hollow plates 21 and 31 which are opposite to the walls directed towards the material fed into the space between the upper and lower run of the two conveyor means. In this case, additional channel means have to be provided to communicate with these passage means in the plates and such additional channel means will be located between the lugs 211, respectively 311. In such an arrangement, the shafts 22 extending between the rollers 221, respectively the shafts 32 extending between the rollers 311 are omitted and corresponding short stud shafts are provided held by snap rings or equivalent means against axial displacement with regard to the lugs 211, respectively 311.

Such studs shafts will also have to be provided if the machine includes, as mentioned before, abutment rails or abutment rollers, engaging the plates 21, respectively 31 on the walls thereof opposite to the walls directed toward the material in the space between the upper and the lower run. Furthermore, if the upper conveyor means 2 is adjustably mounted on the support frame of the apparatus to change the spacing between the lower run of the upper conveyor means and the upper run of the lower conveyor means, the support means 5' for the beams 5 of the upper conveyor means have to be adjustable in elevation together with the adjustment of the beams 5 and any abutment means or any channel means at the top walls of the upper plates 21 have also to be adjustably mounted on the machine frame.

An endless band 10 guided over guide rolls, as shown in FIG. 1, extends about the plates 21 forming the upper conveyor means 2 and this band engages the surfaces of the plates forming the lower run of the upper conveyor means as shown in FIG 1, and an endless band 11 guided by guide rollers as shown in FIG. 1 extends about the plates 31 of the lower conveyor means 3 in engagement with the plates 31 forming the upper run of the lower conveyor means so that these bands are taken along by the friction between the band surfaces and the corresponding surfaces of the plates 21 and 31. The band 11 of the lower conveyor means extends with a left portion thereof, as viewed in FIG. 1, beyond the left end of the band 10 and the material to be processed in the apparatus is fed onto this extended portion of the band 11 from a feed hopper 12 by means of a feed roll 13. The apparatus may also include means for feeding elongated reinforcing means 42 into the space between the upper and the lower runs, and these means may include a pair of rolls 43 and 44 arranged to the left of the feed roll 13 and driven by means not shown in the drawing.

The walls of the hollow plates 21 of the upper conveyor means which form during passage of the plates along the lower run of the upper conveyor means the bottom walls of these plates may also be formed with a plurality of closely spaced openings 213 therethrough and in this case the endless band 10 extending about the plates of the upper conveyor means is formed with a plurality of corresponding openings 111 therethrough so that any fluid fed into the interior of the plates 21 during the passage thereof along the lower run may impinge on and penetrate into the material fed between the gap formed between the lower run of the upper conveyor means and the upper run of the lower conveyor means. Corresponding openings may also be formed in the plates 31 and the endless band 11 of the lower conveyor means.

It will be understood that each of the elements described above, or two or more together, may also find a useful application in other types of apparatus for producing a continuous web or a continuous row of bodies from a selected material differing from the types described above.

While the invention has been illustrated and described as embodied in an apparatus for producing a continuous web or a continuous row of bodies and including a pair of endless conveyor means each formed from a plurality of hollow plates hingedly connected to each other, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for producing a continuous web or a continuous row of bodies from a selected material comprising, in combination, support means; a pair of endless conveyor means each formed from a plurality of hollow plates hingedly connected to each other and each of said plates being formed with open passage means having an outer end and an inner end communicating with the interior of the hollow plate; two pairs of roller means turnably mounted on said support means and respectively supporting said pair of endless conveyor means for movement along a path in which one of said conveyor means has a lower run and the other an upper run arranged adjacent and facing said lower run to define an elongated space between said runs; a plurality of channel means stationarily mounted on said support means, said stationarily mounted channel means having stationary outlet ends arranged at least along the path of one of said runs facing said outer ends of said passage means in said hollow plates so as to communicate with the same during movement of said plates relative to said stationary channel means, thus enabling feeding of plates; and means for feeding material into the space between said upper and lower runs.

2. Apparatus for producing a continuous web or a continuous row of bodies from a selected material comprising, in combination, support means; a pair of endless conveyor means each formed from a plurality of hollow, box-shaped plates having opposite side walls, said plates being hingedly connected to each other and each of said plates being formed in each of said side walls with open passage means therethrough having an outer end and an inner end communicating with the interior of the hollow plate; two pairs of roller means turnably mounted on said support means and respectively supporting said pair of endless conveyor means for movement along a path in which one of said conveyor means has a lower run and the other an upper run arranged adjacent and facing said lower run to define an elongated space between said runs; a plurality of channel means stationarily mounted on said support means, said stationarily mounted channel means being respectively arranged adjacent said opposite side walls of said plates and having stationary outlet ends arranged at least along said upper and lower runs so as to communicate with said outer ends of said passage means in said side walls of said plates at least during movement thereof along said upper and lower runs, respectively, for feeding a fluid into the interior of each plate through the passage means in one side wall and for discharging fluid through the passage means in the other side wall; and means for feeding material into the space between said upper and lower runs.

3. Apparatus for producing a continuous web or a continuous row of bodies from a selected material comprising, in combination, support means; a pair of endless conveyor means each formed from a plurality of hollow, box-shaped plates having opposite side walls, said hollow plates being hingedly connected to each other and each of said hollow plates being formed in each of said side walls with open passage means therethrough having an outer end and an inner end communicating with the interior of the hollow plate; two pairs of roller means turnably mounted on said support means and respectively supporting said pair of endless conveyor means for movement along a path in which one of said conveyor means has a lower run and the other an upper run arranged adjacent and facing said lower run to define an elongated space between said runs; a plurality of channel means stationarily mounted on said support means, said stationarily mounted channel means being respectively arranged adjacent said opposite side walls of said hollow plates and having stationary outlet ends arranged at least along said upper and lower runs so as to communicate with said outer ends of said passage means in said side walls of said hollow plates at least during movement thereof along said upper and lower runs, respectively, for feeding a fluid into the interior of each hollow plate through the passage means in one side wall and for discharging fluid through the passage means in the other side wall; means for feeding material into the space between said upper and lower runs; and side plates connected to opposite side walls of each hollow plate of at least one of said conveyor means and projecting toward the corresponding hollow plate of the other conveyor means during passage of said hollow plates along the upper and lower runs, respectively, to prevent escape of material laterally from the space between said runs.

4. Apparatus for producing a continuous web or a continuous row of bodies from a selected material comprising, in combination, support means; a pair of endless conveyor means each formed from a plurality of hollow, box-shaped plates having opposite side walls, said hollow plates being hingedly connected to each other and each of said hollow plates being formed in each of said side walls with open passage means therethrough having an outer end and an inner end communicating with the interior of the hollow plate; two pairs of roller means turnably mounted on said support means and respectively supporting said pair of endless conveyor means for movement along a path in which one of said conveyor means has a lower run and the other an upper run arranged adjacent and facing said lower run to define an elongated space between said runs; a plurality of stationarily mounted channel means stationarily mounted on said support means, said stationarily mounted channel means being respectively arranged adjacent said opposite side walls of said hollow plates and having stationary outlet ends arranged at least along said upper and lower runs so as to communicate with said outer ends of said passage means in said side walls of said hollow plates at least during movement thereof along said upper and lower runs, respectively, for feeding a fluid into the interior of each hollow plate through the passage means in one side wall and for discharging fluid through the passage means in the other side wall; means for feeding material into the space between said upper and lower runs; side plates connected to opposite side walls of each hollow plate of at least one of said conveyor means and projecting toward the corresponding plate of the other conveyor means during passage of said plates along the upper and lower runs, respectively, to prevent escape of material laterally from the space between said runs; and elongated sealing means on said side plates of said one conveyor means and the hollow plates of the other conveyor means along facing edge portions of said side plates and hollow plates to seal any gap between said facing edge portions.

5. Apparatus for producing a continuous web or a continuous row of bodies from a selected material comprising, in combination, support means; a pair of endless conveyor means each formed from a plurality of hollow, box-shaped plates having opposite side walls, said hollow plates being hingedly connected to each other and each of said hollow plates being formed in each of said side walls with open passage means therethrough having an outer end and an inner end communicating with the interior of the hollow plate; two pairs of roller means turnably mounted on said support means and respectively supporting said pair of endless conveyor means for movement along a path in which one of said conveyor means has a lower run and the other an upper run arranged adjacent and facing said lower run to define an elongated space between said runs; beam means on said support means respectively arranged on opposite sides of said pair of conveyor means for guiding the hollow plates thereof at least during the movement of said hollow plates along said upper and lower runs, respectively; a plurality of channel means stationarily mounted on said support means, said stationarily mounted channel means being respectively arranged adjacent said opposite side walls of said hollow plates and having stationary outlet ends arranged at least along said upper and lower runs so as to communicate with said outer ends of said passage means in said side walls of said hollow plates at least during movement thereof along said upper and lower runs, respectively, for feeding a fluid into the interior of each hollow plate through the passage means in one side wall and for discharging fluid through the passage means in the other side wall; means for feeding material into the space between said upper and lower runs; side plates connected to opposite side walls of each hollow plate of at least one of said conveyor means and projecting toward the corresponding hollow plate of the other conveyor means during passage of said plates along the upper and lower runs, respectively, to prevent escape of material laterally from the space between said runs; and elongated sealing means on said side plates of said one conveyor means and the hollow plates of the other conveyor means along facing edge portions of said side plates and hollow plates to seal any gap between said facing edge portions.

6. Apparatus for producing a continuous web or a continuous row of bodies from a selected material comprising, in combination, support means; a pair of endless conveyor means each formed from a plurality of hollow, box-shaped plates having opposite side walls, said hollow plates being hingedly connected to each other and each of said hollow plates being formed in each of said side walls with open passage means therethrough having an outer end and an inner end communicating with the interior of the hollow plate; means for hingedly connecting adjacent hollow plates of each conveyor means to each other and including a pair of lugs at each end of each plate, each lug having a free end portion overlapping the end portion of a lug on the adjacent plate, said overlapping end portions on adjacent plates being formed with aligned bores, and a shaft extending through said aligned bores; a pair of guide rollers respectively mounted on opposite ends of each shaft; two pairs of roller means turnably mounted on said support means and respectively supporting said pair of endless conveyor means for movement along a path in which one of said conveyor means has a lower run and the other an upper run arranged adjacent and facing said lower run to define an elongated space between said runs; guide means on said support means for guiding said guide rollers during passage of said conveyor means along the respective paths; a plurality of channels means stationarily mounted on said support means, said stationarily mounted channel means being respectively arranged adjacent said opposite side walls of said hollow plates and having stationary outlets ends arranged at least along said upper and lower runs so as to communicate with said outer ends of said passage means in said side walls of said hollow plates at least during movement thereof along said upper and lower runs, respectively, for feeding a fluid into the interior of each hollow plate through the passage means in one side wall and for discharging fluid through the passage means in the other side wall; means for feeding material into the space between said upper and lower runs; side plates connected to opposite side walls of each hollow plate of at least one of said conveyor means and projecting toward the corresponding hollow plate of the other conveyor means during passage of said plates along the upper and lower runs, respectively, to prevent escape of material laterally from the space between said runs; and elongated sealing means on said side plates of said one conveyor means and the hollow plates of the other conveyor means along facing edge portions of said side plates and hollow plates to seal any gap between said facing edge portions.

7. Apparatus for producing a continuous web or a continuous row of bodies from a selected material comprising, in combination, support means; a pair of endless conveyor means each formed from a plurality of hollow, box-shaped plates having opposite side walls, said hollow plates being hingedly connected to each other and each of said hollow plates being formed in each of said side walls with open passage means therethrough having an outer end and an inner end communicating with the interior of the hollow plate; two pairs of roller means turnably mounted on said support means and respectively supporting said pair of endless conveyor means for movement along a path in which one of said conveyor means has a lower run and the other an upper run arranged adjacent and facing said lower run to define an elongated space between said runs; beam means mounted on said support means immovably in direction of said path and respectively arranged on opposite sides of said pair of conveyor means for guiding the hollow plates thereof at least during the movement of said plates along said upper and lower run, respectively; stationary channel means formed in said beam means on the sides thereof respectively facing said side walls of said hollow plates, said stationary channel means having stationary outlet ends arranged at least along said upper and lower runs so as to communicate with said outer ends of said passage means in said hollow plates during movement of the latter along said upper and lower runs, respectively; conduit means communicating with the interior of said stationary channel means for feeding a fluid into the channel means adjacent one side of said hollow plates and for discharging fluid from the channel means at the other side of said hollow plates; sealing means on said beam means about said outlet ends of said channel means and between the latter and said outer ends of said passage means; means engaging said beam means for pressing the latter toward said side walls of said hollow plates, respectively; means for feeding material into the space between said upper and lower runs; side plates connected to opposite side walls of each hollow plate of at least one of said conveyor means and projecting toward the corresponding hollow plate of the other conveyor means during passage of said hollow plates along the upper and lower runs, respectively, to prevent escape of material laterally from the space between said runs; and elongated sealing means on said side plates of said one conveyor means and the hollow plates of the other conveyor means along facing edge portions of said side plates and hollow plates to seal and gap between said facing edge portions.

8. Apparatus for producing a continuous web or a continuous row of bodies from a selected material comprising, in combination, support means; a pair of endless conveyor means each formed from a plurality of hollow, box-shaped plates having opposite side walls, said hollow plates being hingedly connected to each other and each of said hollow plates being formed in each of said side walls with open passage means therethrough having an outer end and an inner end communicating with the interior of the hollow plate; two pairs of roller means turnably mounted on said support means and respectively supporting said pair of endless conveyor means for movement along a path in which one of said conveyor means has a lower run and the other an upper run arranged adjacent and facing said lower run to define an elongated space between said runs; beam means mounted on said support means immovably in direction of said path and respectively arranged on opposite sides of said pair of conveyor means for guiding the hollow plates thereof at least during the movement of said plates along said upper and lower run, respectively; stationary channel means formed in said beam means on the sides thereof respectively facing said side walls of said hollow plates, said stationary channel means having stationary outlet ends arranged at least along said upper and lower runs so as to communicate with said outer ends of said passage means in said hollow plates during movement of the latter along said upper and lower runs, respectively; conduit means communicating with the interior of said stationary channel means for feeding a fluid into the channel means adjacent one side of said hollow plates and for discharging fluid from the channel means at the upper side of said hollow plates; sealing means on said beam means about said outlet ends of said channel means and between the latter and said outer ends of said passage means; means engaging said beam means for pressing the latter toward said side walls of said hollow plates, respectively; guide rollers on said hollow plates; guide means on support means for guiding said guide rollers during passage of said conveyor means along the respective rollers, said guide means for one of said conveyor means being formed in the beam means extending along said one conveyor means; means cooperating with said beam means of said one conveyor means for adjusting the position thereof relative to that of the other beam means to change thereby the spacing between said upper and said lower run; means for feeding material into the space between said upper and lower runs; side plates connected to opposite side walls of each hollow plate of at least one of said conveyor means and projecting toward the corresponding hollow plate of the other conveyor means during passage of said hollow plates along the upper and lower runs, respectively, to prevent escape of material laterally from the space between said runs; and elongated sealing means on said side plates of said one conveyor means and the hollow plates of the other conveyor means along facing edge portions of said side plates and hollow plates to seal any gap between said facing edge portions.

9. Apparatus for producing a continuous web or a continuous row of bodies from a selected material comprising, in combination, support means; a pair of endless conveyor mean each formed from a plurality of hollow plates hingedly connected to each other and each of said hollow plates being formed with open passage means having an outer end and an inner end communicating with the interior of the hollow plate; two pairs of roller means turnably mounted on said support means and respectively supporting said pair of endless conveyor means for movement along a path in which one of said conveyor means has a lower run and the other an upper run arranged adjacent and facing said lower run to define an elongated space between said runs; a plurality of channel means stationarily mounted on said support means, said stationarily mounted channel means having stationary outlet ends arranged at least along the path of one of said runs facing said outer ends of said passage means in said hollow plates so as to communicate with the same during movement of said plates relative to said stationary channel means, thus enabling feeding of a fluid into the interior of said plates; means for feeding material into the space between said upper and lower runs; and means mounting at least one roller means of one of said pairs of roller means adjustable in a direction toward and away from the corresponding roller means of the other pair of roller means to change thereby the inclination of said runs with respect to each other.

10. Apparatus for producing a continuous web or a continuous row of bodies from a selected material comprising, in combination, support means; an upper endless conveyor means having a lower run and a lower endless conveyor means having an upper run spaced from and facing the lower run of said upper conveyor means, each of said conveyor means being formed from a plurality of box-shaped, hollow plates hingedly connected to each other, each of said plates having a pair of opposite side walls, each of the hollow plates of said upper conveyor means being formed in a wall thereof which, during passage of the hollow plate along the lower run, forms the top wall of the plate with open passage means therethrough having an outer end and an inner end communicating with the interior of the respective hollow plate and each of the plates of said lower conveyor means being formed in a wall thereof which, during passage of the hollow plate along the upper run, forms the bottom wall of the hollow plate, with passage means therethrough having an outer end and an inner end communicating with the interior of the respective plate; two pairs of roller means turnably mounted on said support means and respectively supporting said upper and lower conveyor means for movement along a path in which said lower and said upper runs are arranged adjacent to but spaced from each other to define an elongated space between said runs; a pair of channel means stationarily mounted on said support means and respectively extending along the top walls of the hollow plates forming said lower run of said upper conveyor means and the bottom walls of the hollow plates forming said upper run of said lower conveyor means and respectively communicating with the outer ends of the passage means in said hollow plates forming said upper and lower runs, respectively; means for feeding material into the space between said upper and lower runs; and side plates connected to opposite side walls of each hollow plate of said lower conveyor means and projecting toward the corresponding hollow plate of said upper conveyor means to prevent escape of material in lateral direction from the space between said runs.

11. Apparatus for producing a continuous web or a continuous row of bodies from a selected material comprising, in combination, support means; an upper endless conveyor means having a lower run and a lower endless conveyor means having an upper run spaced from and facing the lower run of said upper conveyor means, each of said conveyor means being formed from a plurality of box-shaped, hollow plates hingedly connected to each other and being formed in each of said side walls thereof with open passage means therethrough having an outer end and an inner end communicating with the interior of the respective hollow plate, said plates of said upper and said lower conveyor means being formed in the walls thereof facing each other during passage of the hollow plates along said upper and lower runs, respectively, with openings therethrough; two pairs of roller means turnably mounted on said support means and respectively supporting said upper and lower conveyor means for movement along a path in which said lower and said upper runs are arranged adjacent to but spaced from each other to define an elongated space between said runs; a plurality of channel means stationarily mounted on said support means, said stationarily mounted channel means having stationary outlet ends arranged at least along the path of one of said runs facing said outer ends of said passage means in said hollow plates so as to communicate with the same during movement of said plates relative to said stationary channel means, thus enabling feeding of a fluid into the interior of said hollow plates; means for feeding material into the space between said upper and lower runs; and side plates connected to opposite side walls of each hollow plate of said lower conveyor means and projecting toward the corresponding hollow plate of said upper conveyor means to prevent escape of material in lateral direction from the space between said runs.

12. Apparatus for producing a continuous web or a continuous row of bodies from a selected material comprising, in combination, support means; a pair of endless conveyor means each formed from a plurality of hollow plates hingedly connected to each other and each of said plates being formed with open passage means having an outer end and an inner end communicating with the interior of the hollow plate; two pairs of roller means turnably mounted on said support means and respectively supporting said pair of endless conveyor mean for movement along a path in which one of said conveyor means has a lower run and the other an upper run arranged adjacent and facing said lower run to define an elongated space between said runs; a plurality of channel means stationarily mounted on said support means, said stationarily mounted channel means having stationary outlet ends arranged at least along the path of one of said runs facing said outer ends of said passage means in said hollow plates so as to communicate with the same during movement of said plates relative to said stationary channel means, thus enabling feeding of a fluid into the interior of said plates; means for feeding material into the space between said upper and lower runs; and at least one endless band extending about the plates forming one of said endless conveyor means.

13. Apparatus for producing a continuous web or a continuous row of bodies from a selected material comprising, in combination, support means; an upper endless conveyor means having a lower run and a lower endless conveyor means having an upper run spaced from and facing the lower run of said upper conveyor means, each of said conveyor means being formed from a plurality of box-shaped, hollow plates hingedly connected to each other and each of which having a pair of opposite side walls, each of said plates being formed with open passage means having an outer end and an inner end communicating with the interior of the hollow plate; two pairs of roller means turnably mounted on said support means and respectively supporting said pair of endless conveyor means for movement along a path in which said runs are adjacent each other to define an elongated space between said runs; a plurality of channel means stationarily mounted on said support means, said stationarily mounted channel means having stationary outlet ends arranged at least along the path of one of said runs facing said outer ends of said passage means in said hollow plates so as to communicate with the same during movement of said plates relative to said stationary channel means, thus enabling feeding of a fluid into the interior of said plates; and means for feeding material into the space between said upper and lower runs and including a feed hopper arranged spaced from one end of said upper conveyor means, and a pair of endless bands respectively extending about the plates of said upper and said lower conveyor means, said band of said lower conveyor means extending with a portion thereof beneath said feed hopper.

14. Apparatus for producing a continuous web or a continuous row of bodies from a selected material comprising, in combination, support means; an upper endless conveyor means having a lower run and a lower endless conveyor means having an upper run spaced from and facing the lower run of said upper conveyor means, each of said conveyor means being formed from a plurality of box-shaped, hollow plates hingedly connected to each other and each of which having a pair of opposite side walls, each of said plates being formed with open passage means having an outer end and an inner end communicating with the interior of the hollow plate; two pairs of roller means turnably mounted on said support means and respectively supporting said pair of endless conveyor means for movement along a path in which said runs are adjacent each other to define an elongated space between said runs; a plurality of channel means stationarily mounted on said support means, said stationarily mounted channel means having stationary outlet ends arranged at least along the path of one of said runs facing said outer ends of said passage means in said hollow plates so as to communicate with the same during movement of said plates relative to said stationary channel means, thus enabling feeding of a fluid into the interior of said plates; means for feeding material into the space between said upper and lower runs and including a feed hopper arranged spaced from one end of said upper conveyor means, and a pair of endless bands respectively extending about the plates of said upper and said lower conveyor means, said band of said lower conveyor means extending with a portion thereof beneath said feed hopper; and means in the region of said feed hopper for feeding elongated reinforcing means in the space between said upper and lower runs and into the material fed into said space.

References Cited by the Examiner
UNITED STATES PATENTS

| 1,868,139 | 7/1932 | Forbes | 25—99 |
| 1,933,934 | 11/1933 | Ruby | 18—4 |
| 2,365,804 | 12/1944 | Clerke | 25—99 |
| 2,934,808 | 5/1960 | Wilson | 25—99 |
| 3,223,053 | 12/1965 | Jimenz et al. | 25—99 |

J. SPENCER OVERHOLSER, *Primary Examiner.*

G. A. KAP, R. D. BALDWIN, *Assistant Examiners.*